United States Patent
Andrigo

(10) Patent No.: US 7,114,686 B2
(45) Date of Patent: Oct. 3, 2006

(54) LOCKING CLIP

(75) Inventor: Gregory James Andrigo, Bracebridge (CA)

(73) Assignee: Dura Global Technologies, Inc., Rochester Hills, MI (US)

( * ) Notice: Subject to any disclaimer, the term of this patent is extended or adjusted under 35 U.S.C. 154(b) by 71 days.

(21) Appl. No.: 11/060,854

(22) Filed: Feb. 18, 2005

(65) Prior Publication Data

US 2005/0206183 A1   Sep. 22, 2005

Related U.S. Application Data

(60) Provisional application No. 60/548,632, filed on Feb. 27, 2004.

(51) Int. Cl.
    *F16B 15/00*   (2006.01)
(52) U.S. Cl. ............................ 248/71; 248/74.1; 24/458
(58) Field of Classification Search ................. 248/71, 248/74.1, 74.2, 74.3, 62; 403/384, 386; 24/458, 24/543
    See application file for complete search history.

(56) References Cited

U.S. PATENT DOCUMENTS

| 4,478,381 | A | * | 10/1984 | Pitton et al. ................. 248/71 |
| 4,564,163 | A | * | 1/1986 | Barnett ........................ 248/71 |
| 4,669,688 | A | * | 6/1987 | Itoh et al. ................... 248/74.2 |
| 5,494,245 | A | * | 2/1996 | Suzuki et al. .............. 248/74.1 |
| 5,820,048 | A | * | 10/1998 | Shereyk et al. ............ 248/68.1 |
| 5,884,372 | A | * | 3/1999 | Anscher et al. ................ 24/339 |
| 6,809,257 | B1 | * | 10/2004 | Shibuya ...................... 174/481 |
| 6,923,407 | B1 | * | 8/2005 | Takeuchi ..................... 248/73 |
| 2004/0182973 | A1 | * | 9/2004 | Kawai .......................... 248/71 |
| 2005/0253025 | A1 | * | 11/2005 | Benoit ........................ 24/74.1 |

* cited by examiner

*Primary Examiner*—Ramon O Ramirez
(74) *Attorney, Agent, or Firm*—Peter D. McDermott; Banner & Witcoff Ltd.; Dean B. Watson

(57) ABSTRACT

A locking clip for locking an elongate piece to a structure has a first portion forming an aperture in a first plane for receiving a rod, tube or other elongate workpiece. The first portion has a first lock portion and an attachment member. The locking clip also has a second portion having an inside surface and a free end. The second portion is connected to the first portion via a hinge for movement (i.e., movement of the second portion of the locking clip relative to the first portion) in a second plane from a closed position to an open position. The second portion also has a second lock portion and a positioning pin extending inwardly from the inside surface. The second portion is lockable in the closed position by engagement of the first and second lock portions with each other.

22 Claims, 5 Drawing Sheets

LOCKING CLIP

This application claims the priority benefit of U.S. provisional patent application Ser. No. 60/548,632 filed on Feb. 27, 2004, entitled Locking Clip.

FIELD OF THE INVENTION

The invention relates to locking clips made to hold and attach elongate articles to supports, and more particularly to attach rods or tubes for use in adjusting an automobile seat to a seat support.

BACKGROUND

Locking clips are useful for securing articles to support structures and other articles. Locking clips are particularly useful in the assembly of motor vehicles.

There is a need for improved locking clips to attach objects to supports that are easily manufactured, durable, and provide ease of assembly.

SUMMARY

In accordance with a first aspect, a locking clip for holding a rod or tube or other elongate piece (sometimes referred to herein as an elongate workpiece) to a structure comprises a first portion forming a first aperture in a first plane for receiving an elongate piece. The first portion has a first lock portion and an attachment member unitary with the first lock portion. The locking clip further includes a second portion comprising an arm having an inside surface and a free end and is connected to the first portion via a hinge for movement in a second plane from an open position to a closed position. The second portion also has a second lock portion, e.g., at the free end of the arm, and a positioning pin extending inwardly from the inside surface of the arm. The second portion is lockable in the closed position by engagement of the first and second lock portions with each other. The attachment member of the first portion of the locking clip is operative to attach the locking clip to the structure. In certain exemplary embodiments, for example, the attachment member may be a so-called "christmas tree" type of attachment. Thus, a workpiece in the aperture of the first portion of the locking clip can be secured to such structure.

In accordance with a second aspect, a locking clip for locking a cylindrical piece to a structure comprises a first portion forming more than one circumferentially closed cylindrical apertures for receiving the cylindrical piece, wherein the apertures are axially aligned with each other in parallel planes. The first portion further includes a first lock portion and an attachment member extending from the first portion. The attachment member is configured to be received by the structure to mount the locking clip to the structure. The locking clip further includes a second portion comprising an arm connected to the first portion via a hinge for movement from an open position to a closed position. In certain exemplary embodiments, the first portion is unitary with the second portion. In certain exemplary embodiments, the hinge is a living hinge. In certain exemplary embodiments the arm is movable in a plane parallel to and between the planes of the two cylindrical apertures of the first portion of the locking clip. The arm has a free end remote from the hinge. In certain exemplary embodiments, the second portion also has a positioning pin extending inwardly from the inside surface of the arm. The second portion is lockable in the closed position, permanently or releasably, by engagement of the first and second lock portions with each other.

In certain exemplary embodiments, substantial advantage is achieved by providing a locking clip that is inexpensive to manufacture. In particular, advantage is achieved by providing a unitary locking clip that is manufactured inexpensively. These and additional features and advantages of the invention disclosed here will be further understood from the following detailed disclosure of certain embodiments.

BRIEF DESCRIPTION OF THE DRAWINGS

Various embodiments of the invention are described below with reference to the accompanying drawings in which.

Figure 1:
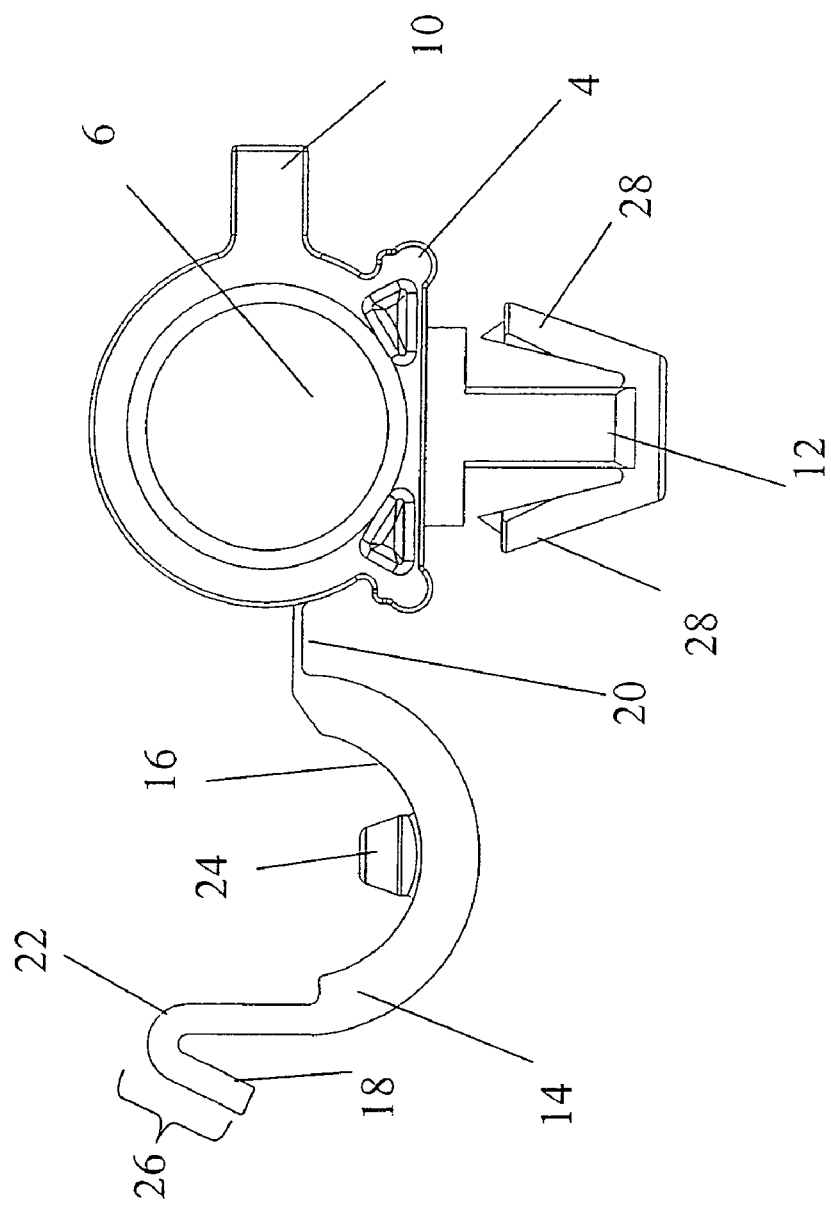
FIG. 1 is a side view of a locking clip in accordance with the present disclosure, shown in the open position.

The figures referred to above are not necessarily to scale and should be understood to present a representation of certain exemplary embodiments of the locking clips disclosed here, illustrative of the principles involved. Some features of the locking clips depicted in the drawings have been enlarged or distorted relative to others to facilitate explanation and understanding.

DETAILED DESCRIPTION OF CERTAIN EXEMPLARY EMBODIMENTS

The examples given here are only illustrative, and it should be understood that there are many alternative embodiments of these locking clips. A person skilled in the art, having the benefit of this disclosure would know how to adapt the examples given for their particular purpose.

The terms "a," "an," and "the" as used herein are defined to mean "one or more" and include the plural unless a contrary meaning is made clear from the particular context. Similarly, certain features of the locking clips and their associated assemblies may be referred to in the appended claims in the singular, however, unless a contrary meaning is made clear from the particular context, such references do not necessarily exclude the correlative plural. For example, the term "an arm" means one or more arms unless a contrary meaning is made clear from the particular context. Similarly, the term "a positioning pin" means one or more such pins unless a contrary meaning is made clear from the particular context.

FIG. 1 shows an exemplary locking clip in the open position. The example shown in FIG. 1 includes a first portion 4 forming a circumferentially closed aperture 6 in a first plane for receiving an elongate piece (38 in FIGS. 3–4). The aperture formed by the first portion may be configured to receive an elongate workpiece of any cross-sectional shape. For example, the apertures may be circular, rectangular, triangular, square, elliptical, or the like to receive similarly shaped elongate members. As used here and in the claims below, the term "circumferentially closed" means that the aperture is formed by a complete or continuous circle (or other shape) of material. The aperture formed by the first portion may alternatively be circumferentially open, for example, a portion of the circumference of the aperture may have a gap or the like.

The locking clip has a first lock portion 10 formed as an axial extension from the first portion 4. Alternative suitable configurations for the lock portion will be apparent to those skilled in the art given the benefit of this disclosure. The locking clip has an attachment member 12 for attaching the locking clip to a structure, e.g., to a wall or bracket or the like. The attachment member 12 is seen to have deformable clips adapted to be radially compressed during insertion into a receiving hole in the support structure and to then spring back into their free position to hold the locking clip to the structure. Alternative suitable configurations for the attachment member will be apparent to those skilled in the art given the benefit of this disclosure. The locking clip has a second portion comprising or formed as an arm 14 having an inside surface 16 and a free end 18. Optionally the second portion may have additional components or features or a different configuration suited to the functions disclosed here. Arm 14 is connected to the first portion 4 via a living hinge 20 for movement in a second plane from a closed position to an open position. The plane in which the arm moves is adjacent to and parallel to the plane of the aperture 6 of the first portion of the locking clip.

The second portion of the locking clip, shown as arm 14 in FIG. 1, has a second lock portion 22 at the free end 18. The arm 14 is lockable in the closed position by engagement of the first and second lock portions 10, 22 to each other. The second lock portion 22 as shown in FIG. 1 is a hook 26, which is releasable or not after engagement with first lock portion 10.

Arm 14 also has a positioning pin 24 extending inwardly from its inside surface 16. The inside surface of the second portion may be arcuate, concave, planar or any other shape or configuration suitable to the intended purpose of the locking clip. Suitable alternative configurations for a particular purpose will be apparent to those having skill in the art given the benefit of this disclosure. If the inside surface of the second portion is arcuate or concave, the positioning pin preferably extends radially inwardly from the inside surface of the second portion. The inside surface of the second portion may be cylindrically aligned with the first portion when the locking clip is in the closed position, such that the first and second portions together cooperatively form a cylindrical channel or way. For example, the aperture of the first portion and an aligned aperture formed by an arm of the second portion in the closed position (adjacent to or spaced from the aperture of the first portion) may be sized such that the outside surface of a tube or other elongate piece held in the locking clip touches the inside surfaces of the two apertures. As used here the term "cylindrically aligned" is intended to include alignment within normal manufacturing tolerances and the like. As used here a cylindrical channel or way is intended to include tube-like configurations and may have a non-uniform or a substantially uniform inside diameter. As used here, substantially uniform is intended to include uniformity within normal manufacturing tolerances and the like. Alternatively, in certain exemplary embodiments, the inside surface of an aperture formed by the second portion in the closed position may be offset from the inside surface of the aperture of the first position With reference to FIG. 2, second lock portion 22 is shown in the closed position. The second lock portion 22 is a hook 26 lockably engaging the axial extension 53, which forms the first lock portion 10. It should be understood that reference here and in the claims to the first lock portion as "axially extending" or as an "axial extension" of the first portion of the locking clip means that the first lock portion extends—or has an operative locking surface that extends—in a direction generally parallel to the axial direction of the aperture formed by the first portion of the locking clip or to the longitudinal direction of a rod or tube or other elongate workpiece received in the aperture. An operative locking surface is a surface or member that in the locked condition directly touches or engages the second lock portion. The lock portion extends in such axial direction in the sense, at least, that it has an operative locking surface that extends in such direction and provides operative access for locking engagement with or to the second lock portion. Locking engagement can be either a permanent locking engagement or a releasable locking engagement. A permanent locking engagement is one which is not releasable without permanent deformation or damage to the locking clip.

In the illustrated embodiments, first portion 4 is unitary with second portion 14. Alternatively, the first and second portions may be manufactured separately and assembled to each other, e.g., via the hinge, to form the locking clip. The locking clip according to certain exemplary embodiments is made of metal, rubber or plastic, e.g., unfilled, filled or reinforced plastic. Other alternatives will be readily apparent to those skilled in the art having the benefit of this disclosure. The locking clip may be manufactured, for example, by injection molding or other types of molding or the like. Other suitable methods of manufacturing and assembling locking clips in accordance with this disclosure will be apparent too those skilled in the art given the benefit of this disclosure.

According to certain exemplary embodiments, the attachment member may be: a post, e.g., a post with ridges; a tube, e.g., a tube with ridges; a snap fit device, e.g., the post with resiliently deflectable wings or tabs such as device 28 in the embodiment of FIG. 1, etc. A snap fit device, as that term is used here and in the claims is any device having one or more appendages or parts that can be reversibly moved during attachment, for example deformed, pinched together or otherwise deflected, etc., such that they can be inserted into a slot, hole or other opening or orifice of a structure. After insertion into the opening of a structure the appendages expand or otherwise return all or part way to their original position or form such that they prevent or interfere with removal of the attachment member from the structure. The locking clip is thereby held to the structure by the attachment member.

Figure 2:
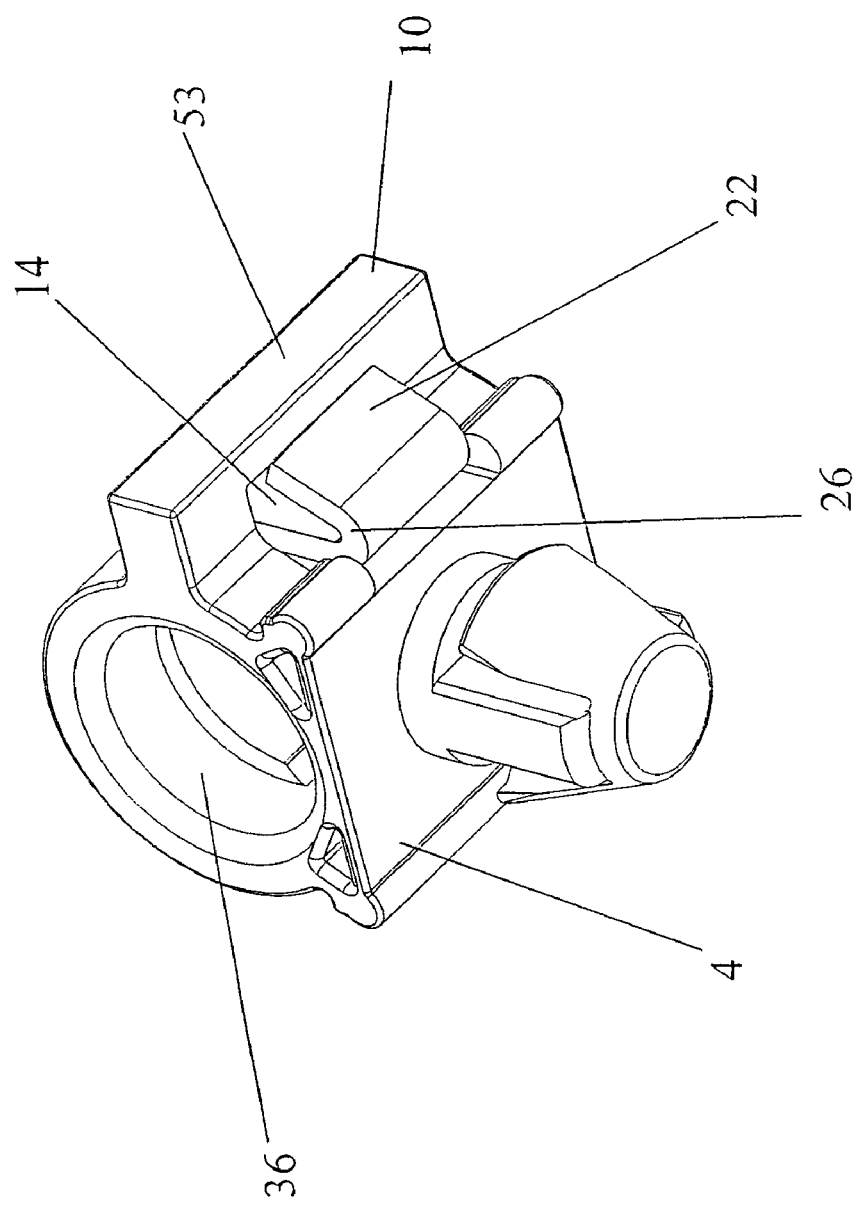
FIG. 2 is a perspective view of the locking clip of FIG. 1 in the closed position.

In certain exemplary embodiments, the hinge can be a living hinge 20. The term "living hinge" is meant to include durable, usually thin, plastic bridges linking the first and second portions of the locking clip and unitary with both the first and second portions of the locking clip. A living hinge allows the second portion to bend relative to the first portion, as would other hinges between the two portions. Other normally understood usages of the term living hinge used by those having skill in the art are also intended. The hinge connecting the first and second potions of the locking clip can also be formed in any manner determined by one of skill in the art to be appropriate for a particular purpose. The phrase "for movement to a closed position . . . from an open position" is intended to include movement from a closed position to an open position and for movement in the open position, and the like. The open position includes any position of the clip where the first and second lock portions are not engaged with each other. The closed position includes the position of the clip when the first and second lock portions are engaged. FIG. 1 shows a locking clip in the open position and FIG. 2 shows a locking clip in the closed position.

In certain exemplary embodiments, and as shown in FIG. 1, the second lock portion 22 is located remote from hinge 20. The second lock portion could also be located near the hinge or in any other position on the second portion. Alternative suitable locking configurations will be apparent to those skilled in the art given the benefit of this disclosure. For example, the second lock portion could be located near the hinge. The term "remote" has its ordinary engineering meaning in this context. In certain exemplary embodiments wherein the second portion of the locking clip comprises an arm, as in the embodiment of FIG. 1, remote means at least halfway from the hinge toward the free end of the arm, the measurement being made along the inside surface of the arm.

In the exemplary embodiment shown in the drawings, the attachment member 12 extends from the first portion and is unitary with the first portion. Reference here and in the claims to the attachment member extending outwardly from the first portion of the locking clip means that attachment member extends in the direction of insertion into a hole in the support structure (or other engagement with the structure to which the locking clip is to be mounted), and that such direction is parallel to or otherwise corresponds generally to the radially outward direction of the aperture(s) of the first portion of the locking clip. Alternatively, the attachment member could be a hole, slot or other orifice in the first portion through which a post, tab, screw, bolt, nail or other attachment device could be used to attach the locking clip to a structure. The attachment member could also be a prepared surface, for example, the hook or the loop portion of an attachment such as Velcro® or the like, which would be attachable to the corresponding loop or hook portion on the surface of a structure. The attachment member could also extend from the second position, be formed by the second portion, or be a prepared surface of the second portion. Alternatively, the attachment member may be a Christmas tree, a snap-fit member, or the like.

According to certain exemplary embodiments, positioning pin 24 is located on an inside surface 16 of the second portion 14 so as to extend in a direction toward a rod or tube or the like held by the locking clip. Exemplary of such embodiments is the locking clip shown in FIG. 1, wherein the positioning pin 24 is seen to extend radially inwardly from the radially inward surface of the arm 14. In the closed position of the locking clip, the positioning pins of such embodiments typically are received into a corresponding pocket or hole in the surface of the rod or tube. The positioning pin can be located centrally or midway between free end 18 and hinge 20 or it can be located closer to one or the other. The positioning pin aids in stabilizing the elongate piece, for example, the positioning pin limits the amount the elongate piece can rotate or move in the longitudinal direction, i.e., the forward and reverse axial directions. The positioning pin may be a pin, a post, a Christmas tree like structure, or the like.

Figure 3:
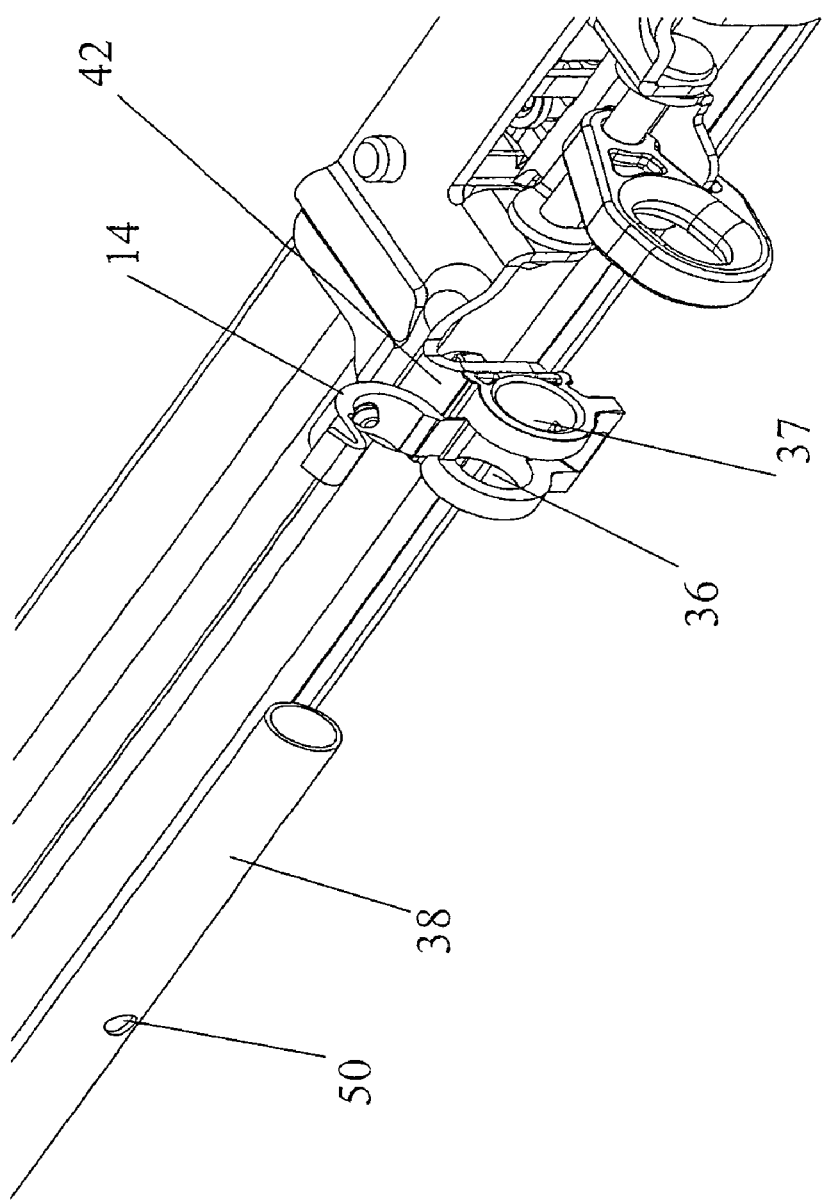
FIG. 3 shows the locking clip of FIG. 1 attached to a structure and in the open position.
Figure 4:
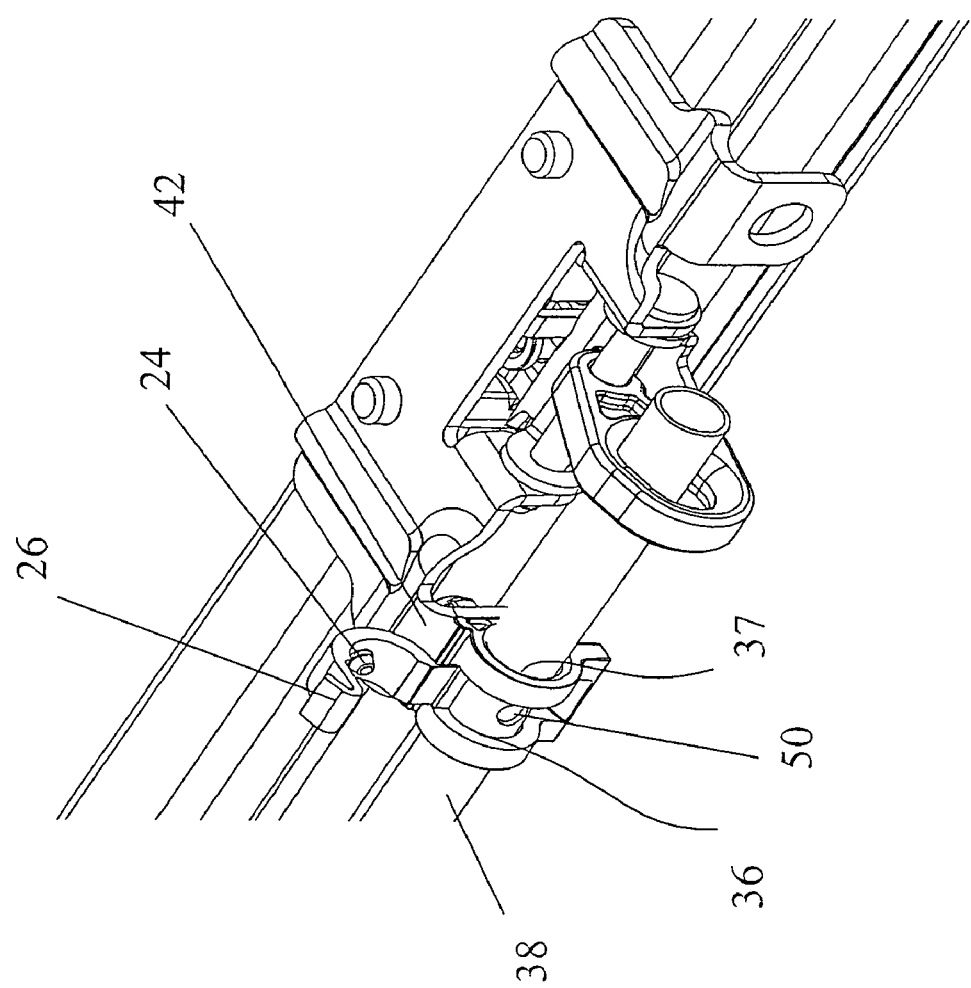
FIG. 4 shows the locking clip of FIG. 1 in the open position attached to a structure with an elongate piece inserted through the apertures of the first portion.

In the embodiment of FIGS. 3 and 4, the locking clip of FIGS. 1 and 2 is arranged for locking a towel bar to a seat track in an automobile seat. A towel bar is the rod typically positioned just below and forward of the seat to permit adjustment of the position of the seat by its occupant. The first portion of the locking clip is seen to form two apertures 36, 37 in spaced parallel planes. The apertures are the same size, are axially aligned with each other, and are circumferentially closed. In other embodiments, either or both apertures may be circumferentially open. The phrase "at least one circumferentially closed aperture for receiving the elongate piece" is intended to include, for example, having two apertures wherein at least one of the apertures is circumferentially closed or both apertures are circumferentially closed. Parallel planes, as used here is meant to include planes that are substantially parallel to each other. Substantially parallel as used here is intended to include precisely parallel or parallel within the limits of ordinary manufacturing tolerances, or the like. Spaced parallel planes, as used here, means parallel planes separated by a distance from each other in a direction normal or perpendicular to the plane. In certain exemplary embodiments the distance between two apertures of the first portion of the locking clip is equal to the width of an aperture formed between them by the second portion of the locking clip in the closed position. Alternatively, the distance separating the first and third planes may be the width of the second portion plus an additional distance. For example, aperture 36 is in a first plane and aperture 37 is in a third plane, which is substantially parallel and separated from the plane of aperture 36. Second portion 14 when in the closed position is in a second plane, which is substantially parallel to and between the first and third planes. The three apertures cooperate to form a cylindrical channel to hold the towel bar 38. Towel bar 38 is seen to have an opening 50 configured (i.e., sized and positioned) to receive the positioning pin of arm 14 when arm 14 is moved to the closed position. Towel bar 38 is thereby prevented from moving axially as it is held by the locking clip. In the exemplary embodiment illustrated, both the resiliency of the locking clip and its flexible or rotatable attachment to the seat track allows the towel bar to rotate during operation by a seat occupant sufficiently for seat adjustment.

In FIG. 4 the towel bar and locking clip arrangement of FIG. 3 is seen in the assembled but not yet locked position. Thus, towel bar 38 with opening 50 is inserted through apertures 36 and 37. The opening 50 is positioned such that it is engagable by positioning pin 24, specifically, the positioning pin is configured to be inserted into opening 50. Arm 14 can be moved from the open position, as shown in FIG. 4, to a closed position, as shown in FIG. 5.

Figure 5:
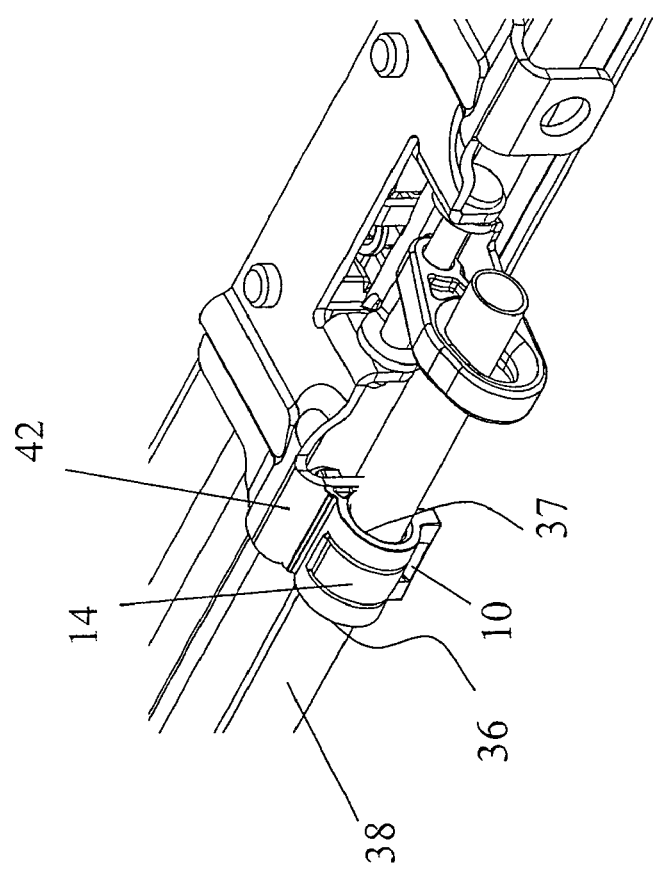
FIG. 5 shows the locking clip of FIG. 1 in the closed position and attaching a towel bay to an automobile strut structure.

In further reference to FIG. 5, towel bar 38 is seen to be inserted through apertures 36 and 37. Arm 14 is between apertures 36, 37 in the closed position, such that second lock portion 22 has lockably engaged first lock portion 10. The attachment member 12 is attached to the automobile seat structure, and the positioning pin 24 of the second portion is in hole 50 of the towel bar, thereby securing the towel bar 38 to seat structure 42. It is seen that arm 14 forms a closed aperture adjacent (and between) the two spaced apertures 36, 37. Adjacent, as used here is intended to include, for example, physically touching or having a minimal space between them, such as spacing resulting from manufacturing tolerances or the like.

In certain exemplary embodiments, the second portion is irreleasably or permanently lockable to the first portion. Alternately, the second portion is releasably lockable in the closed position by engagement of the first and second lock portions to each other.

From the foregoing disclosure and detailed description of certain embodiments, it will be apparent that various modifications, additions and other alternative embodiments are possible without departing from the true scope and spirit of the invention. The embodiments discussed were chosen and described to provide a suitable illustration of the principles of the invention and its practical application, to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled. While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

I claim:

1. A locking clip for holding an elongate piece to a structure, comprising in combination:
    a first portion comprising:
        a first aperture in a first plane for receiving an elongate piece, and
        a first lock portion;
    an attachment member, integral with the first portion; and
    a second portion comprising:
        an arm with an inside surface and a free end,
        a second lock portion, and
        a positioning pin extending inwardly from the inside surface of the arm, the arm being connected to the first portion via a hinge for movement in a second plane from an open position to a closed position, wherein the second portion is lockable in the closed position by engagement of the first and second lock portions with each other.

2. The locking clip of claim 1, wherein the first portion is unitary with the arm of the second portion.

3. The locking clip of claim 1, wherein the first lock portion comprises an axial extension of the first portion, and the second lock portion is unitary with the arm of the second portion and configured to lockingly engage the axial extension.

4. The locking clip of claim 1, wherein the hinge is a living hinge unitary with both the first portion and the second portion of the locking clip.

5. The locking clip of claim 1, wherein at least one of the first locking portion and the second locking portion comprises a hook.

6. The locking clip of claim 1, wherein the first aperture is circumferentially closed.

7. The locking clip of claim 1, wherein the first aperture is a cylindrical aperture.

8. The locking clip of claim 7, wherein the inside surface of the arm of the second portion is arcuate and in the closed potion is cylindrically aligned with the first aperture.

9. The locking clip of claim 7, wherein the attachment member is unitary with the first portion.

10. The locking clip of claim 1, wherein the second lock portion is located at a free end of the arm of the second portion.

11. The locking clip of claim 1, wherein the second plane is substantially parallel to the first plane.

12. The locking clip of claim 1, wherein the arm of the second portion in the closed position is adjacent to the first aperture.

13. The locking clip of claim 1, wherein the arm of the second portion is releasably lockable in the closed position.

14. The locking clip of claim 1, wherein the positioning pin is configured to engage an opening in an elongate piece received by the first aperture.

15. The locking clip of claim 1, wherein the second lock portion is remote from the hinge.

16. The locking clip of claim 1, wherein the attachment member extends outwardly from the first portion.

17. The locking clip of claim 1, wherein the first portion further comprises a second aperture in a third plane.

18. The locking clip of claim 17, wherein the first aperture, the second portion in the closed position, and the third aperture cooperatively form a cylindrical channel of substantially uniform inside diameter.

19. A locking clip assembly comprising, in combination:
    a support structure;
    an elongate piece; and
    a locking clip comprising:
        a first portion comprising:
            circumferentially closed apertures in spaced parallel planes, the elongate piece extending through the apertures, and
            a first lock portion;
        an attachment member extending from the first portion into the support structure;
        a second portion unitary with the first portion and comprising:
            an arm having an inside surface and a free end,
            a second lock portion, and
            a positioning pin extending inwardly from the inside surface; and
        a living hinge connecting the first portion to the second portion remote from the free end of the arm, for movement of the arm from an open position to a closed position in a plane parallel to the spaced parallel planes of the apertures,
    wherein the second portion is lockable in the closed position by engagement of the first and second lock portions with each other.

20. The locking clip of claim 19, wherein the first lock portion extends axially from the first portion and the second lock portion is a hook capable of lockably engaging the axial extension when in the closed position.

21. The locking clip of claim 19, wherein the second portion is releasably lockable in the closed position by engagement of the first and second lock portions.

22. A locking clip for holding a towel bar to a seat track of an automobile seat, comprising:
    a plastic first portion comprising:
        first and second closed cylindrical apertures in spaced parallel planes for receiving an elongate piece, and
        a first lock portion;
    an attachment member unitary with the first portion and extending outwardly from the first portion for attachment to a seat track;
    a plastic second portion unitary with the first portion and comprising:
        an arcuate arm having an inside surface and a free end,
        a second lock portion located at the free end, and
        a positioning pin extending radially inwardly from the inside surface of the arm to be received by an opening in an elongate piece extending through the apertures of the first portion; and
    a living hinge connecting the first portion to the second portion remote from the free end, for movement of the second portion in a plane parallel to and between the first and second apertures of the first portion, from an open position to a closed position,
wherein the second portion is lockable in the closed position by engagement of the first and second lock portions to each other.

* * * * *